Dec. 24, 1957  B. W. SWANSON  2,817,154
THREAD COMPARATOR AND FACE SQUARENESS GAUGE
Filed Jan. 19, 1955  2 Sheets-Sheet 1

INVENTOR
BROR W. SWANSON

BY Lindsey and Prutzman
ATTORNEYS

Dec. 24, 1957 B. W. SWANSON 2,817,154
THREAD COMPARATOR AND FACE SQUARENESS GAUGE
Filed Jan. 19, 1955 2 Sheets-Sheet 2

INVENTOR
BROR W. SWANSON

BY *Lindsey and Pritzman*
ATTORNEYS

United States Patent Office 2,817,154
Patented Dec. 24, 1957

2,817,154

THREAD COMPARATOR AND FACE SQUARENESS GAUGE

Bror W. Swanson, West Hartford, Conn., assignor to The Whitney Chain Company, Hartford, Conn., a corporation of Connecticut Application January 19, 1955, Serial No. 482,855

10 Claims. (Cl. 33—199)

The present invention relates to comparators for gauging workpieces having an internally threaded bore and a working face normal to the bore, such as nuts and the like. More particularly, the invention relates to an improved comparator for gauging the internal threads of such workpieces and simultaneously gauging the squareness of the working face relative to the axis of the internal threads.

In the manufacture of nuts and other workpieces having an internally threaded bore and a working face normal to the axis of the threads, it is often important to control the squareness of the working face relative to the axis of the threads within very close tolerances. Particularly is this so where such parts are to be used in equipment having surfaces intended to mate in sealing relation without benefit of gaskets, or in other applications where warping of parts or unequal distribution of stress on the threads caused by lack of such squareness is objectionable. Accurate gauging of face squareness relative to thread axis in such workpieces has heretofore required a gauging operation separate and distinct from gauging of the threads themselves, and involving the expenditure of time and effort necessary to provide a separate set-up, as well as additional handling of parts, all of which is objectionably costly. It is a principal object of the present invention therefore to provide an improved gauging instrument for such workpieces in which both the internal threads and the squareness of the working face can be checked at one time.

Another object is to provide a comparator in which checking of internal threads and squareness of working face of such workpieces may be accomplished by a single person in the same gauging operation, without requiring any additional setups or manipulation of the workpiece other than that heretofore required for gauging the internal threads alone.

Another object is to provide a comparator for simultaneously gauging internal thread diameter and working face squareness of nuts and the like which can accommodate parts having a wide variety of thread diameters, which has a high degree of accuracy, which is convenient and easy to use, and which enables rapid inspection of parts with minimum fatigue of inspection personnel.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
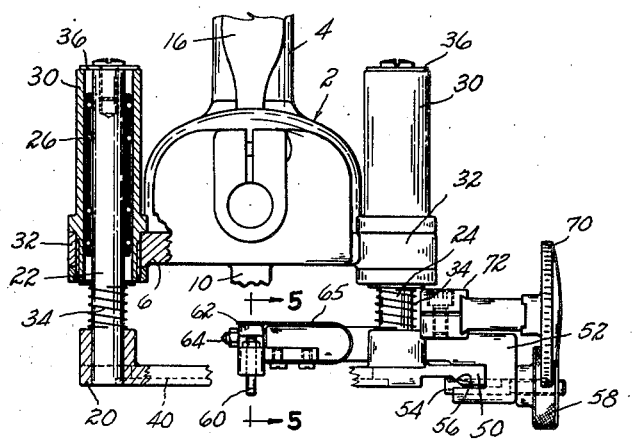
Fig. 1 is a fragmentary top view of a comparator constructed in accordance with the present invention, with certain portions broken away.
Figure 2:
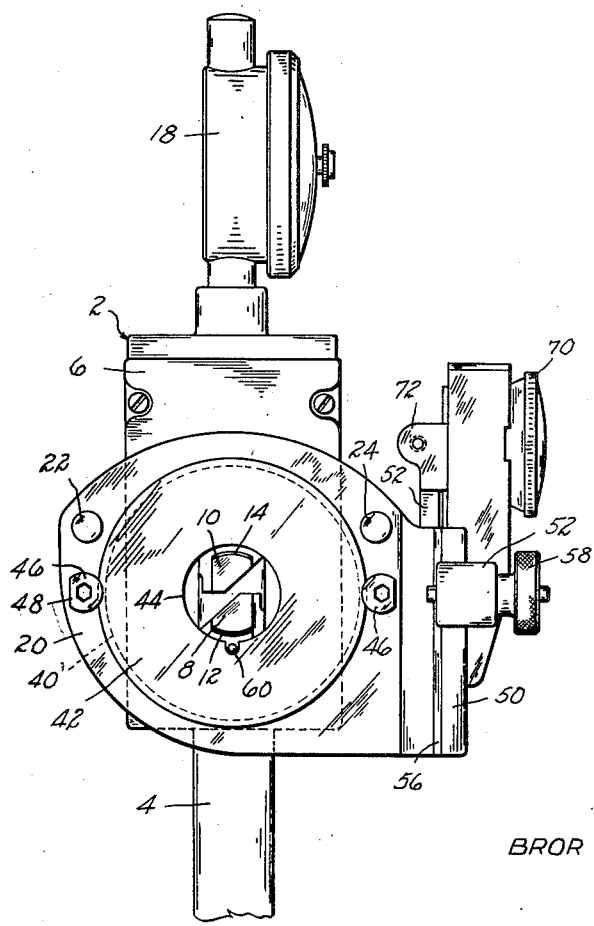
Fig. 2 is a fragmentary front elevation view of the comparator.
Figure 3:
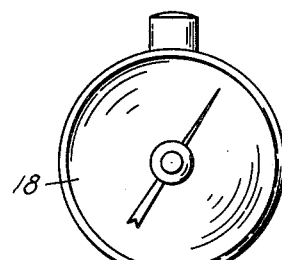
Fig. 3 is a side elevation view of the comparator.
Figure 5:
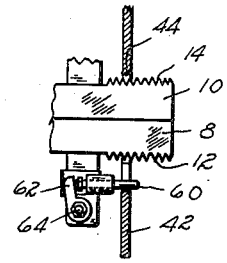
Fig. 5 is a fragmentary side elevation view, partly in section showing certain details of construction of the comparator.
Figure 4:
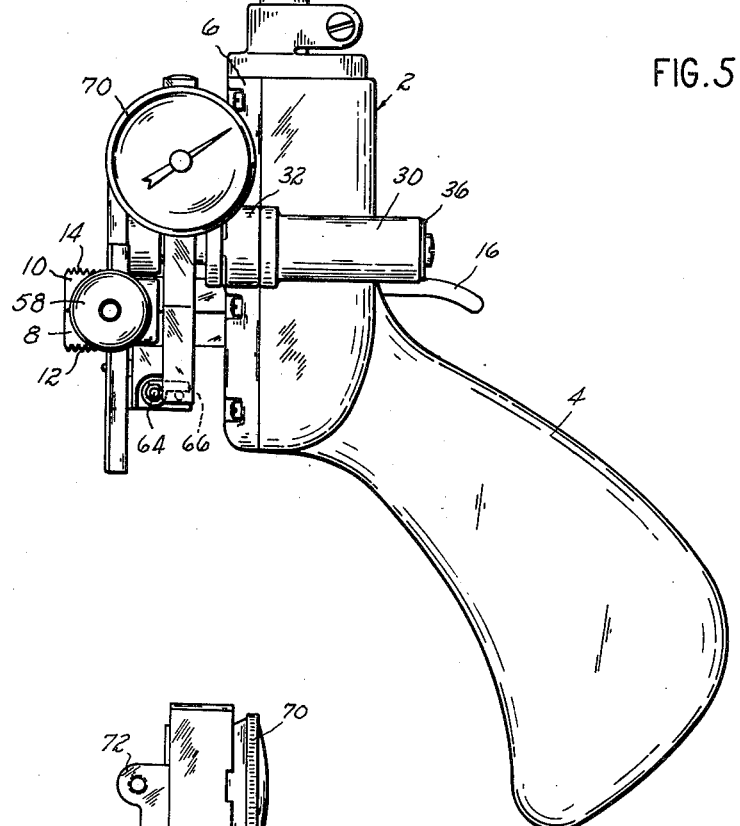
Fig. 4 is a top view of a portion of the comparator.
Figure 4:
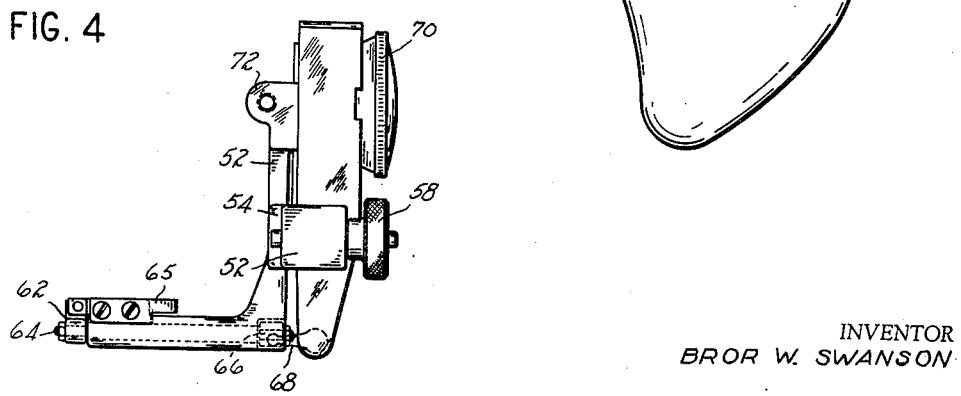

Referring to the drawings, a comparator constructed in accordance with the present invention includes an upstanding hollow casing or frame 2 provided with a handle 4 of the pistol-grip type. The front of the frame is closed by a cover 6 through which extends horizontally a pair of gauge members 8, 10 disposed in parallel spaced relation one above the other and having diametrically spaced coaxial thread segments 12, 14. The gauge members are removably mounted in the frame to permit interchange with others of different thread diameter, and one gauge member 8 is mounted in fixed relation to the frame while the other gauge member 10 is mounted for relative movement in a vertical direction. A thumbpiece or lever 16 connected to movable gauge member 10 provides manual means whereby the two gauge members may be conveniently brought together to permit their insertion within the threaded bore of a nut or other workpiece. A spring, not shown, within the frame urges gauge member 10 in an upward direction so as to engage the thread segments with the threads of a workpiece automatically when the thumbpiece is released. Mounted in a collet on the top of the frame is a dial indicator 18 arranged to indicate changes in the position of the movable gauge member 10 and thus provide a reading of the diametral spacing of the thread segments 12, 14.

In front of the cover is a carriage including a generally ring-shaped member 20 disposed parallel to the cover and surrounding the gauge members. The carriage is mounted on the frame for movement parallel to the axis of the thread segments 12, 14. To this end the carriage is supported by spaced parallel rearwardly extending rods 22, 24, each of which is mounted for reciprocal movement parallel to the axis of the thread segments in a cylindrical ball bearing 26 in a sleeve 30 carried by a laterally projecting ear 32 on each side of the frame. The carriage is urged forwardly by a light compression spring 34 on each of the rods, and its forward movement is limited by the engagement of a stop 36 on the rearward end of each rod with the rearward end of each sleeve 30.

The ring 20 has an annular groove forming a forwardly facing annular shoulder 40 concentric and square with the axis of the thread segments 12, 14. Seated against the shoulder 40 is an annular face plate 42 having a central opening 44 slightly larger than the outside diameter of the thread segments 12, 14, and through which the gauge members extend. The face plate 42 and carriage are so positioned relative to the frame that in the forwardmost position of the carriage the forward ends of thread segments 12, 14 will project slightly in front of the face plate. The face plate 42 is arranged to be removable in order to permit its replacement with another face plate having a larger or smaller central opening 44 when the gauge members 8, 10 are interchanged with others of larger or smaller thread diameter. To this end the face plate is retained on the carriage by a pair of diametrically spaced cap screws 46, which clamp the face plate firmly against the reference surface provided by shoulder 40, so that absolute squareness of the face plate relative to the axis of the thread segments is assured. A flat 48 on the head of each cap screw 46 permits the face plate to be removed merely by turning the screws 180°.

At one side, the carriage is formed with a vertically extending rail 50. A bracket 52 is secured to the rail for vertical adjustment thereon by a clamp having a movable jaw 54 adapted to be drawn against a beveled surface 56 on the rail by a knurled hand nut 58. The bracket 52 extends radially behind the face plate 42 and at its inner end carries a feeler pin 60 radially spaced below the thread segment on the fixed gauge member 8. The pin 60 is mounted for longitudinal sliding movement in a direction parallel to the axis of the thread segments. The pin is backed up by a crank 62 on a transverse shaft 64 carried by the bracket and is urged forward by a light leaf spring 65 on the bracket engageable with crank 62. Forward movement of the pin is stopped by a collar on the pin at a position such that the pin extends slightly in front of the face plate through a notch in the periphery of opening 44. The shaft 64 transmits movement of pin 60 to another crank 66, which engages the actuating lever 68 of a dial indicator 70 mounted on the bracket 52 by a clamp 72, so that the dial indicator 70 indicates longitudinal movement of the pin 60 relative to face plate 42.

In the operation of the comparator, the gauge members are drawn together by depressing the thumbpiece 16 and a nut or other internally threaded workpiece is slipped over the thread segments 12, 14 with its working face facing the face plate 42. Upon release of the thumbpiece, the gauge members are spring urged apart and the thread segments 12, 14 mesh with diametrically spaced portions of the internal threads of the nut. The dial indicator 18 indicates the displacement of the movable gauge member 10 and thus provides the desired measurement of the thread diameter in the nut.

To check its face squareness, the nut is merely rotated on the threads of the gauge members to advance it axially toward the face plate 42. As the nut advances, its working face first engages the forward end of the feeler pin 60 and carries the pin rearwardly, and then engages the face plate 42. As the nut is further rotated, the pin 60 rides against the nut face and the sleeve and ball bearing mounting of rods 22, 24 permits the carriage to be displaced rearwardly relative to the gauge members against the force of springs 34. Thus the relative longitudinal position of the carriage and the working face of the nut will be constant once the nut engages the face plate 42, and therefore any lack of squareness in the working face of the nut will be completely and exclusively indicated in terms of the axial movement of the pin 60 relative to the carriage. Such movement of the pin 60 is, of course, transmitted through the crank 62, transverse shaft 64, and crank 66 to the actuating lever 68 of the dial indicator 70, which thus provides a direct, immediate and conveniently readable indication of the nut face squareness.

To gauge nuts or other workpieces of different thread size, the gauge members are removed and replaced with others of corresponding thread size, and the face plate is likewise replaced with one having an opening 44 of suitable size to accommodate the gauge members with a small clearance. The vertical adjustment of bracket 52 on rail 50 permits radial adjustment of the pin 60 relative to the axis of the thread segments 12, 14, for engagement with nuts of different sizes, the pin being preferably adjusted to engage a nut face at about its radial midpoint.

The comparator above described has many advantages. Since it enables the checking of face squareness of a nut or other workpiece at the same time, on the same instrument, and with the same setup used to check the diameter of its internal threads, it will be appreciated that it affords substantial savings in time and equipment required to check such workpieces accurately. Since both the face plate 42 and the gauge members 8, 10 are removable and interchangeable with others of different size, the comparator can conveniently accommodate and accurately gauge workpieces having a wide variety of thread diameters or working face sizes. The reading of the two dial indicators 18, 20 can be noted in a single gauging operation and by a single individual, and thus all additional time, effort and handling of the workpiece required for a separate gauging operation is completely eliminated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a comparator having a frame and a support projecting from the frame, said support being provided with threads adjacent its outwardly extending end and engageable with a threaded workpiece of the type having a face disposed transversely of the axis of the threads thereof, the combination of a carriage mounted on the frame for movement relative to the support and parallel to the axis of the threads of the support, a plate member on the carriage disposed normal to the axis of the threads of the support between the frame and said outwardly extending end of the support, means providing an aperture in the plate member disposed coaxially of the axis of the threads of the support, said support extending through said aperture with the threads of the support normally extending on either side of the plate member, a flat surface on the plate member facing said outwardly extending end of the support and being engageable with the transversely disposed face of the workpiece when a workpiece is threaded on said outwardly extending end of the support and advanced relative to the support, means urging the carrier toward said outwardly extending end of the support, a feeler pin on the carriage normally extending through the plate member in the direction of said outwardly extending end of the support for engagement with the transversely disposed face of a workpiece and movable relative to the plate member in the direction of movement of said plate member, an indicator on the carriage movable therewith, and means operatively connecting the feeler pin with the indicator whereby the indicator will measure the movement of the feeler pin relative to the plate member.

2. The combination with an internal thread comparator having a frame, a pair of longitudinally extending gauge members mounted on the frame for relative lateral movement and having longitudinally external coaxial threaded portions, means for moving said gauge members toward each other for insertion thereof within the threads of an internally threaded workpiece, means for urging said gauge members apart to engage the threads thereof with the internal threads of the workpiece, and means for indicating the relative spacing of said gauge members, of means for gauging the squareness of a working face of said workpiece relative to the axis of the threads therein comprising a carriage mounted on the frame for longitudinal movement relative to said gauge members and having a longitudinally facing surface arranged to be engaged by the working face of a workpiece through which said gauge members are inserted, a longitudinally movable feeler pin on the carriage arranged to be engaged by said working face means to adjust the feeler pin radially relative to the axis of the threads of the workpiece, and indicator means on the carriage arranged to measure the movement of said feeler pin relative to said carriage.

3. In an internal thread comparator, a frame, a pair of longitudinally extending parallel laterally spaced externally threaded gauge members mounted on the frame for relative lateral movement, manual means for moving said gauge members toward each other for insertion thereof within the threads of an internally threaded workpiece, a spring for urging said gauge members apart, means for indicating the relative spacing of said gauge members, and means for gauging the squareness of a working face of said workpiece relative to the axis of the threads therein on said gauge comprising a carriage mounted on the frame for longitudinal movement relative to said gauge members, a longitudinally facing annular shoulder on said carriage surrounding said gauge members and disposed in the path of the working face of a workpiece threaded thereon, a feeler pin on the carriage disposed in the path of said working face and movable in the direction of movement of said carriage relative to said longitudinally facing annular shoulder, a dial indicator on the carriage arranged to measure the movement of said pin relative to said longitudinally facing shoulder, said feeler pin and said dial indicator being simultaneously movable radially relative to the axis of the threads on said gauge members, and means to retain said feeler pin and said dial indicator in radially adjusted position.

4. The combination with an internal thread comparator having a frame, a pair of removable and interchangeable longitudinally extending parallel laterally spaced externally threaded gauge members mounted on the frame for relative lateral movement, manual means for moving said gauge members toward each other for insertion thereof within the threads of a nut, a spring for urging said gauge members apart, and means for indicating the relative spacing of said gauge members, of means for gauging the squareness of the nut face relative to the axis of the threads therein comprising a carriage mounted on the frame for longitudinal movement relative to said gauge members, a removable and interchangeable face plate on the carriage having a central opening through which said gauge members extend and having a longitudinally facing surface arranged to be engaged by the face of a nut threaded on said gauge members, whereby advance of said nut on the threads of said gauge members will engage the nut face with said face plate and displace said carriage longitudinally relative to said gauge members, a longitudinally movable feeler pin on the carriage, means for radially adjusting said feeler pin relative to the axis of said gauge members to align said feeler pin with the nut face, and a dial indicator on the carriage arranged to measure the longitudinal movement of said feeler pin relative to said face plate.

5. The combination with an internal thread comparator having a frame, a pair of longitudinally extending parallel laterally spaced externally threaded gauge members mounted on the frame for relative lateral movement, manual means for moving said gauge members toward each other for threading thereon of a nut to be gauged, a spring for urging said gauge members apart, and means for indicating the relative spacing of said gauge members, of means for gauging the squareness of the nut face relative to the axis of the nut threads comprising a pair of laterally spaced longitudinally extending cylindrical sleeves on the frame, cylindrical ball bearings in said sleeves, a carriage having a pair of longitudinally extending plungers supported in said ball bearings for longitudinal movement of said carriage relative to said frame, an annular face plate on the carriage surrounding said gauge members and having a longitudinally facing surface arranged to be engaged by the face of a nut threaded on said gauge members, whereby advance of said nut on the threads of said gauge members will engage the nut face with said face plate and displace said carriage longitudinally relative to said gauge members, a longitudinally movable feeler pin on the carriage arranged to be engaged by said nut face, and a dial indicator on the carriage arranged to measure the movement of said feeler pin relative to said face plate as said nut is advanced on the threads of said gauge members.

6. The combination with an internal thread comparator having a frame, a pair of longitudinally extending parallel laterally spaced externally threaded gauge members removably mounted on the frame for relative lateral movement, manual means for moving said gauge members toward each other for insertion thereof within the threads of a nut, a spring for urging said gauge members apart, and means for indicating the relative spacing of said gauge members, of means for gauging the squareness of the nut face relative to the axis of its threads comprising a pair of laterally spaced longitudinally extending cylindrical sleeves on the frame, cylindrical ball bearings in said sleeves, a carriage having a pair of longitudinally extending plungers supported in said ball bearings for longitudinal movement of said carriage relative to said frame, an annular face plate removably mounted on the carriage surrounding said gauge members and having a longitudinally facing surface arranged to be engaged by the face of a nut threaded on said gauge members, whereby advance of said nut on the threads of said gauge members will engage the nut face with said face plate and displace said carriage longitudinally relative to said gauge members, a longitudinally movable feeler pin on the carriage arranged to be engaged by said nut face, means for adjusting the radial position of said feeler pin relative to the axis of said gauge members, and a dial indicator on the carriage arranged to measure the movement of said feeler pin relative to said face plate.

7. In an internal thread comparator, a frame, a pair of removable and interchangeable parallel gauge members mounted on the frame for relative lateral movement and having longitudinally extending external coaxial threads, manual means for moving said gauge members toward each other for insertion thereof within the threads of a nut, a spring for urging said gauge members apart to engage the threads thereof with the internal threads of the nut, means for indicating the relative spacing of said gauge members, and means for gauging the squareness of the nut face relative to the axis of its threads comprising a pair of laterally spaced longitudinally extending cylindrical sleeves on the frame, cylindrical ball bearings in said sleeves, a carriage having a pair of longitudinally extending plungers supported in said ball bearings for longitudinal movement of said carriage relative to said frame, a removable and interchangeable face plate on the carriage having a central opening through which said gauge members extend and having a surface surrounding the gauge members facing longitudinally in one direction and arranged to be engaged by the face of a nut threaded on the gauge members, whereby advance of the nut on the threads of the gauge members will displace said carriage longitudinally in the other direction relative to said gauge members, a second spring biasing said carriage in said one direction, a bracket on the carriage radially adjustable relative to the axis of said gauge member threads, a longitudinally movable feeler pin mounted on said bracket in the path of said nut face, a third spring urging said feeler pin in said one direction, and a dial indicator on the bracket operatively connected to said feeler pin for measuring longitudinal movement of said feeler pin relative to said face plate as said nut is advanced on the threads of said gauge members.

8. In a comparator having a frame, a pair of gauge members mounted on the frame for relative lateral movement and provided with longitudinally extending coaxially threaded portions at one end thereof, means for moving said gauge members toward each other for insertion thereof within the threads of an internally threaded workpiece, means for urging said gauge members apart to engage the threaded portions thereof with the internal threads of the workpiece, and means for indicating the relative spacing of the gauge members, means for gauging the squareness of a working face of said workpiece relative to the axis of the threads therein comprising a carriage mounted on the frame for longitudinal movement relative to said gauge members, a surface on the carriage facing said one end of the gauge members and surrounding the gauge members for engagement with the working face of a workpiece through which said gauge members are inserted, said surface on the carriage being disposed between the frame and said one end of the gauge members, a feeler pin on the carriage extending beyond said surface toward said one end of the gauge members for engagement with said working face prior to engagement of said surface by said working face, said feeler pin being movable in the direction of movement of the carriage relative to said surface, indicator means on the carriage adapted to measure the movement of said feeler pin relative to said surface, and a spring biased lever operatively connecting said feeler pin with said indicator means and urging said feeler pin toward working face engagement.

9. In a comparator having a frame, a pair of gauge members mounted on the frame for relative lateral movement and having longitudinally extending coaxially threaded portions, means for moving said gauge members toward each other for insertion thereof within the threads of a nut, a spring for urging said gauge members apart, and means for indicating the relative spacing of said gauge members, an attachment for gauging the squareness of the nut face relative to the axis of its threads comprising a carriage mounted on the frame for longitudinal movement relative to said gauge members, a removable and interchangeable face plate on the carriage having a central opening through which said gauge members extend and having a longitudinally facing surface arranged to be engaged by the face of a nut threaded on said gauge members, whereby advance of said nut on the threads of said gauge members will engage the nut face with said face plate and displace said carriage longitudinally relative to said gauge members, a longitudinally movable feeler pin on the carriage, means for radially adjusting said feeler pin relative to the axis of said gauge member threaded portions to align said feeler pin with said nut face, and a dial indicator on the carriage arranged to measure the longitudinal movement of said feeler pin relative to said face plate.

10. A nut face squareness checking attachment for a comparator of the type having a frame, a pair of longitudinally threaded gauge members mounted on the frame for relative lateral movement, means for moving said gauge members toward each other for insertion thereof within the threads of a nut, a spring for urging said gauge members apart, and means for indicating the relative spacing of said gauge members, said attachment comprising a carriage mounted on the frame for longitudinal movement relative to said gauge members, a removable and interchangeable annular face plate on the carriage surrounding said gauge members and having a longitudinally facing surface arranged to be engaged by the face of a nut threaded on said gauge members, whereby advance of said nut on the threads of said gauge members will engage the nut face with said face plate and displace said carriage longitudinally relative to said gauge members, a longitudinally movable feeler pin on the carriage arranged to be engaged by said nut face, means for adjusting the radial position of said feeler pin relative to the axis of said gauge members, and a dial indicator on the carriage arranged to measure the movement of said feeler pin relative to said face plate as the nut is advanced on said gauge members.

References Cited in the file of this patent

UNITED STATES PATENTS

| | | |
|---|---|---|
| 2,427,152 | Moore | Sept. 9, 1947 |
| 2,648,135 | Gates | Aug. 11, 1953 |
| 2,700,224 | Johnson | Jan. 25, 1955 |